United States Patent [19]
Dickson

[11] Patent Number: 5,761,073
[45] Date of Patent: Jun. 2, 1998

[54] PROGRAMMABLE APPARATUS FOR SYNCHRONIZING FREQUENCY AND PHASE OF TWO VOLTAGE SOURCES

[75] Inventor: Stephen E. Dickson, Edwardsville, Ill.

[73] Assignee: Basler Electric Company, Highland, Ill.

[21] Appl. No.: 663,553

[22] Filed: Jun. 13, 1996

Related U.S. Application Data

[63] Continuation-in-part of Ser. No. 385,289, Feb. 9, 1995, Pat. No. 5,640,060.

[51] Int. Cl.⁶ .................................................. H02J 1/00
[52] U.S. Cl. .............................. 364/484; 307/87; 307/73; 307/75
[58] Field of Search ........................ 364/484; 327/244; 307/73, 84, 86, 87, 129, 43, 75, 76, 85

[56] References Cited

U.S. PATENT DOCUMENTS

| | | | |
|---|---|---|---|
| 3,562,545 | 2/1971 | Rubner | 307/87 |
| 3,601,619 | 8/1971 | Ringstad | 307/87 |
| 3,748,489 | 7/1973 | South | 307/87 |
| 3,794,846 | 2/1974 | Schlicher et al. | 307/87 |
| 3,801,796 | 4/1974 | Konrad | 307/87 |
| 3,887,820 | 6/1975 | Glennon | 307/87 |
| 4,031,407 | 6/1977 | Reed | 307/87 |
| 4,032,793 | 6/1977 | Uram | 290/40 C |
| 4,118,635 | 10/1978 | Barrett et al. | 290/40 R |
| 4,121,111 | 10/1978 | Crisafulli | 307/87 |
| 4,249,088 | 2/1981 | Kleba et al. | 307/87 |
| 4,256,972 | 3/1981 | Wyatt et al. | 307/68 |
| 4,310,771 | 1/1982 | Wyatt et al. | 307/64 |
| 4,322,630 | 3/1982 | Mezera et al. | 290/40 C |
| 4,429,233 | 1/1984 | Kammiller | 307/87 |
| 4,492,874 | 1/1985 | Near | 290/40 B |
| 4,575,671 | 3/1986 | Lee et al. | 322/16 |
| 4,687,946 | 8/1987 | Jones | 290/40 R |
| 4,766,327 | 8/1988 | Fox | 307/87 |
| 4,788,647 | 11/1988 | McManus et al. | 364/494 |
| 4,800,291 | 1/1989 | Bowers | 307/87 |
| 4,841,218 | 6/1989 | Rosinnes et al. | 322/24 |
| 4,874,961 | 10/1989 | Henderson | 307/87 |
| 4,937,462 | 6/1990 | Recker et al. | 307/19 |
| 4,937,463 | 6/1990 | Kobayashi et al. | 307/87 |
| 4,953,052 | 8/1990 | Cartlidge et al. | 361/20 |
| 4,964,058 | 10/1990 | Brown, Jr. | 364/492 |
| 4,965,463 | 10/1990 | Maruyama et al. | 307/87 |
| 5,006,781 | 4/1991 | Schultz et al. | 322/25 |
| 5,070,251 | 12/1991 | Rhodes et al. | 307/46 |
| 5,091,839 | 2/1992 | Gaul et al. | 363/41 |
| 5,194,757 | 3/1993 | Wertheim | 307/87 |
| 5,264,732 | 11/1993 | Florina et al. | 307/66 |

Primary Examiner—Emanuel T. Voeltz
Assistant Examiner—Tony M. Cole
Attorney, Agent, or Firm—Senniger, Powers, Leavitt & Roedel

[57] ABSTRACT

A programmable autosynchronizer for use with a system having generator and bus voltages and having a breaker circuit for connecting the generator and bus voltages to each other. The autosynchronizer synchronizes the frequency and phase of the generator and bus AC voltages by controlling the generator voltage. A microprocessor compares the frequencies of generator and bus voltage signals, the microprocessor generating a proportional difference signal having a parameter representative of a proportional difference in frequency between the generator and bus voltage signals. The proportional correction range extends within the synchronization range. The microprocessor permits a sync signal when the frequency difference of the frequencies of the generator and bus voltage signals is within the synchronization frequency range. A first output circuit responsive to the proportional difference signal provides a correction signal to the generator for varying the frequency of the generator. A second output circuit responsive to the sync signal provides a breaker close signal to the breaker circuit for closing the breaker thereby enabling connection of the generator and bus voltages. A frequency correction dead band within the frequency range and a target slip band within the dead band define a zone of limited proportional correction to nudge the generator into synchronization and prevent a hung scope.

21 Claims, 4 Drawing Sheets

PROGRAMMABLE APPARATUS FOR SYNCHRONIZING FREQUENCY AND PHASE OF TWO VOLTAGE SOURCES

This invention is a continuation in part of an earlier filed application Ser. No. 08/385,289, filed Feb. 9, 1995, now U.S. Pat. No. 5,640,060, issued Jun. 17, 1997.

BACKGROUND OF THE INVENTION

This invention relates to a programmable electronic circuit for use with an electrical generator having a speed governor which responds to raise or lower control signals to change the generator output frequency and phase to approach the frequency and phase of a bus to which the generator will be synchronized.

When an electrical generator is connected to an energized electrical system, the generator voltage parameters, such as magnitude, frequency and phase angle must be matched to the parameter of the electrical system. Electrical apparatus are presently available which will accomplish this matching prior to closing the generator breaker. However, the time required to match the generator voltage to the electrical system voltage (e.g., parameter bus voltage, frequency and phase angle) is very often excessive.

For example, some presently available circuits will provide a continuous raise or lower signal until the difference between the generator frequency and bus frequency is adjusted to within permissible limits. If a continuous raise signal was being applied (i.e., the generator frequency was too low), the generator frequency may overshoot the desired value and hunt for some time before a frequency match is attained.

Some frequency matching systems have attempted to solve this overshooting and hunting problem by periodically providing raise or lower control signals which are pulses. For example, the pulses will have a presettable pulse width or duration produced when the frequency difference is above a predetermined threshold. When the frequency difference is below this predetermined threshold, correction pulses will cease. Thus, below this latter predetermined threshold, the generator frequency is not controlled.

Synchronizers which control voltage are well known, such as disclosed in co-assigned U.S. Pat. No. 4,800,291 issued Jan. 24, 1989 for "Electronic Circuit for Control of a Voltage Regulator of an Electrical Generator," the entire disclosure of which is incorporated herein by reference. There is a need for a synchronizer which controls frequency (speed) in addition to voltage so that the generator output voltage, the generator output frequency, and the generator output phase approach the voltage, frequency and phase of the bus to which the generator will be synchronized.

SUMMARY OF THE INVENTION

It is an object of this invention to provide a microprocessor controlled autosynchronizer which synchronizes the frequency and phase of first and second AC voltage sources by controlling the frequency of the first voltage source.

It is another object of this invention to provide an autosynchronizer providing proportional control of the frequency of a generator voltage source to be synchronized with a bus voltage source.

It is another object of this invention to provide such an autosynchronizer in which the proportional correction range extends within the synchronization frequency range.

It is still another object of this invention to provide such an autosynchronizer in which a maximum correction signal is provided when a difference in frequencies of the voltages is outside the proportional correction range.

It is still another object of this invention to provide such an autosynchronizer in which no proportional correction of the first voltage source is achieved when the frequency difference of the voltages is within a frequency correction dead band equal to positive and negative frequency differences less than a half maximum slip difference.

It is another object of this invention to provide such an autosynchronizer in which no proportional control of the frequency of the first voltage source is achieved when the frequency difference is within a frequency correction dead band equal to positive frequency differences less than a half maximum slip difference and greater than zero slip.

It is another object of this invention to provide such an autosynchronizer which provides a reduced proportional difference signal within a target slip band to prevent a sustained steady state out of phase relationship between the first and second voltages.

The invention comprises an apparatus for use with a system having first and second voltage sources having first and second alternating current (AC) voltages, respectively. The system has a breaker circuit for connecting the first and second voltage sources to each other. The apparatus synchronizes frequency and phase of the first and second AC voltages by controlling the first voltage source. A first conditioning circuit connected to the first voltage source provides a first voltage signal representative of the AC voltage of the first source. A second conditioning circuit connected to the second voltage source provides a second voltage signal representative of the AC voltage of the second source. A microprocessor compares frequencies of the first and second voltage signals and generates a proportional difference signal having a parameter representative of a proportional difference in frequency between the first and second voltage signals. The microprocessor permits a sync signal when the frequency difference of the frequencies of the first and second voltage signals is within a synchronization frequency range. A first output circuit responsive to the proportional difference signal provides a correction signal to the first voltage source for varying the frequency of the first voltage. A second output circuit responsive to the sync signal provides a breaker close signal to the breaker circuit for closing the breaker thereby connecting the first and second voltage sources. Proportional control of the frequency of the first voltage source is achieved when the frequency of the first voltage source is not synchronized with the frequency of the second voltage source.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
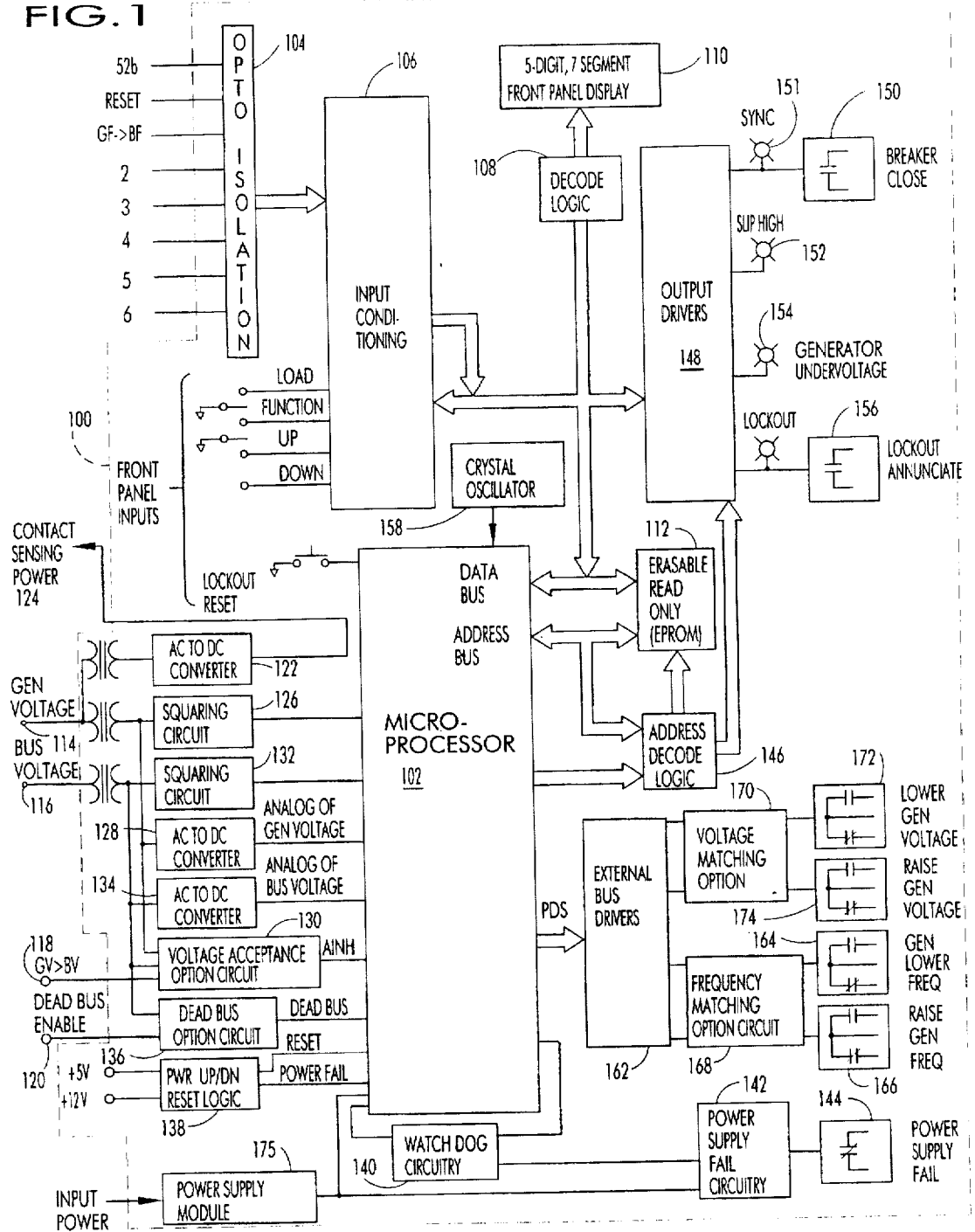
FIG. 1 is a functional block diagram of the synchronizer according to the invention for synchronizing a generator to a voltage bus.
Figure 2:
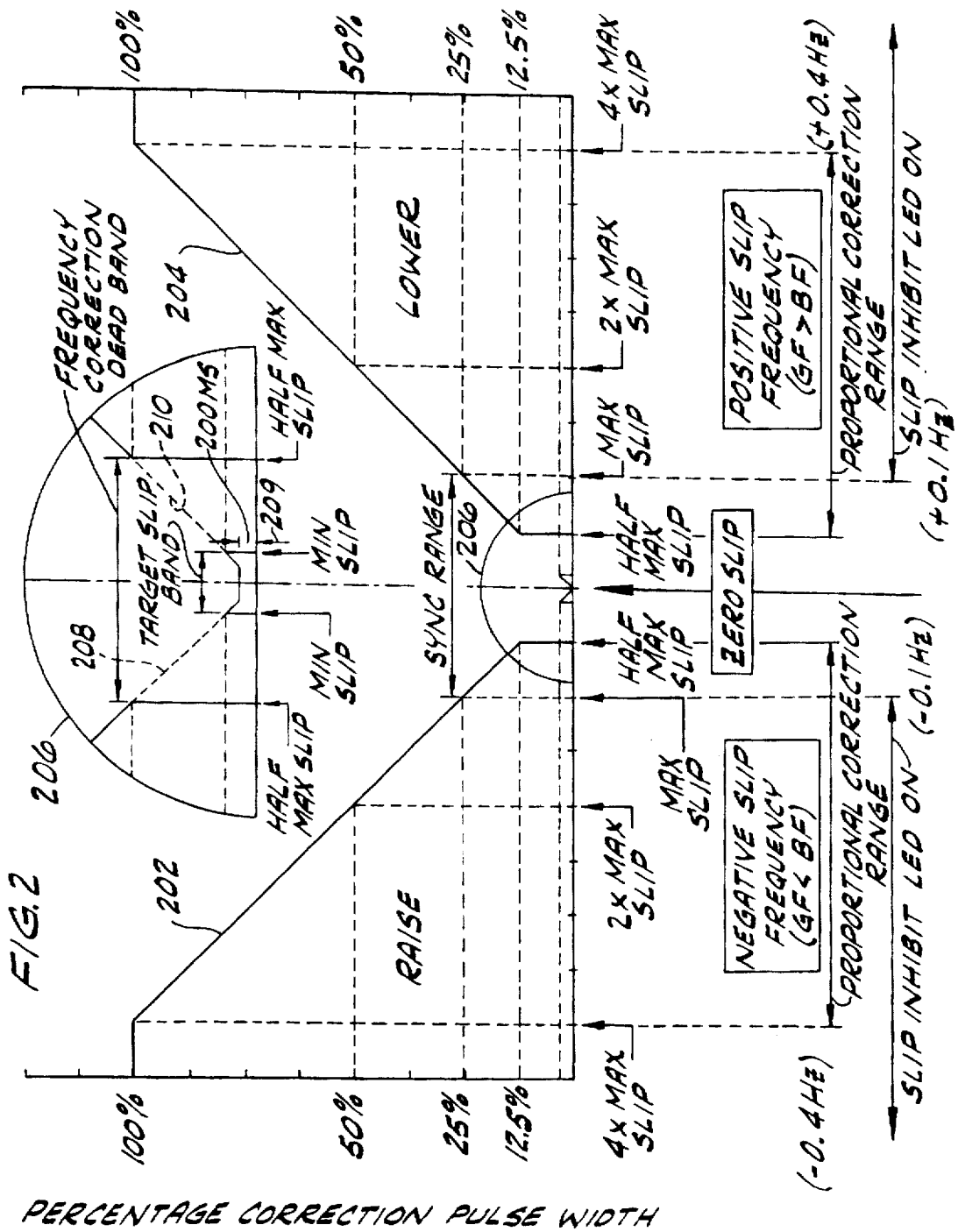
FIG. 2 is a graph illustrating symmetrical proportional frequency control above and below a frequency correction dead band centered around a zero slip frequency difference with frequency difference along the x-axis and speed correction duty cycle along the y-axis. The frequency control is symmetrical about the zero slip line.
Figure 3:
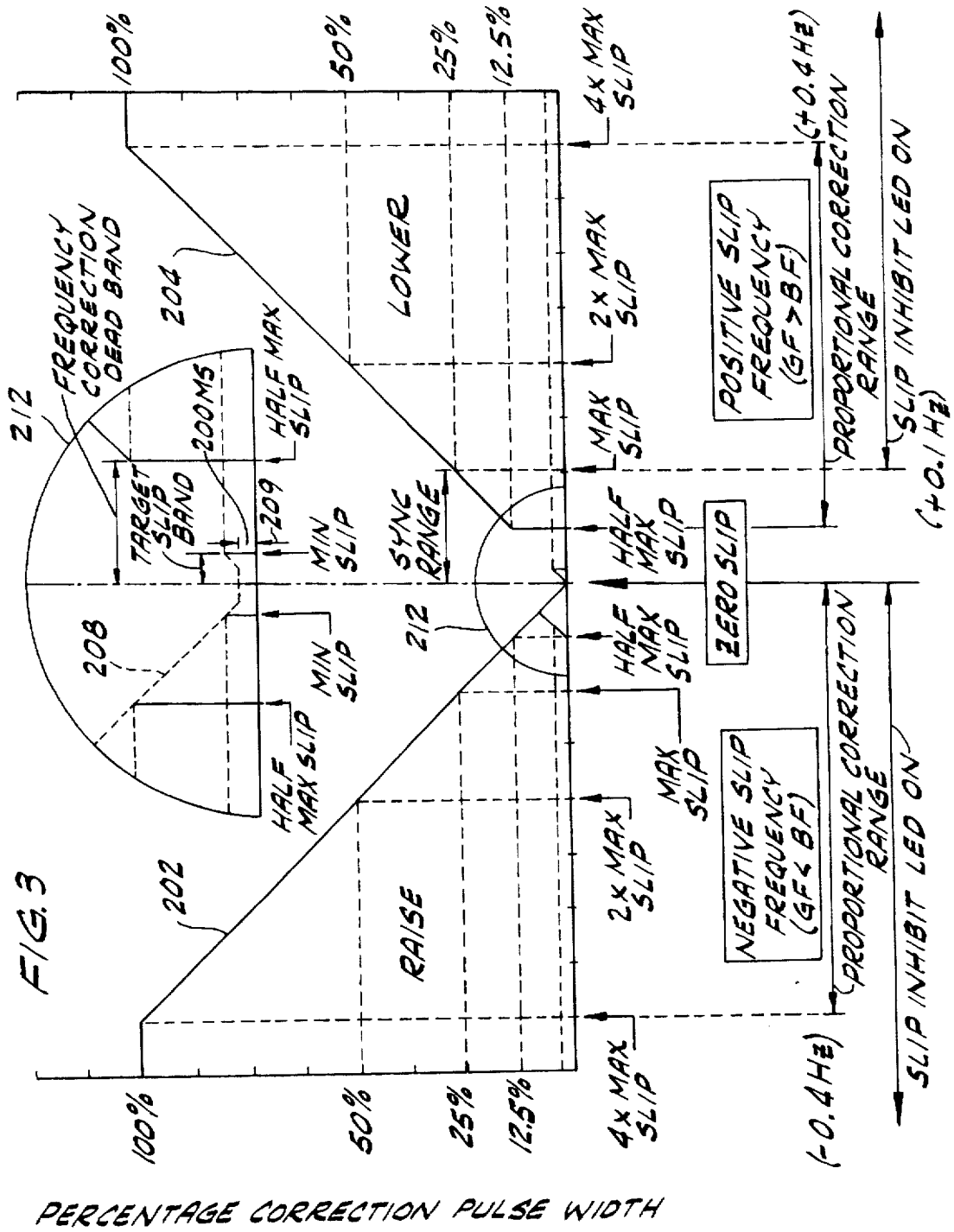
FIG. 3 is a graph illustrating proportional frequency control above a frequency correction dead band and below a zero slip frequency difference with frequency difference along the x-axis and speed correction duty cycle along the y-axis. The frequency control outside the sync range is symmetrical about the zero slip line.

FIG. 1 is a functional block diagram of the autosynchronizer 100 of the invention. A microprocessor 102, such as a 68HC11 manufactured by Motorola, receives various inputs and provides various outputs as will be described below. The microprocessor 102 is programmed to permit a generator having a speed governor to be connected via a breaker to a bus in response to proportional generator frequency control as illustrated in FIGS. 2 and 3. In general, autosynchronizer 100 may be used to synchronize the frequency of any two voltages, such as two generators, two buses, or a combination thereof, as long as at least one of the frequencies is controlled..

Autosynchronizer 100 receives various system input data via opto-isolators 104. In particular, input 52b is an auxiliary contact indicating an ON/OFF status of the breaker, the reset input resets the autosynchronizer from an external operator accessible switch, the GF greater than BF (GF>BF) input indicates a switch position selecting the FIG. 3 option, and inputs 2–6 indicate a rotary switch position defining generator selection, i.e., 1 to 6 generators may be selected.

This information is provided to an input conditioning circuit 106 which also receives other front panel inputs which are used by an operator to read and/or review the autosynchronizer's programmable settings and readings, selecting the particular functions of the autosynchronizer 100, or manually increasing (up) or decreasing (down) its settings. The programmable settings include: breaker time, frequency correction pulse width, frequency correction pulse interval, maximum slip frequency, generator undervoltage, and lockout enable. The readings include: generator voltage magnitude, bus voltage magnitude, real time phase angle difference (between generator and bus frequency), active breaker selection, and advance angle. The input conditioning circuits 106 provide the information to a data bus input of microprocessor 102. The microprocessor displays the settings and reading on the 5-digit 7 segment front panel display 110 via the decode logic circuit 108. The microprocessor 102 stores the setting information in the EEPROM 112.

The microprocessor 102 also receives input information from a generator voltage input 114 connected to the generator voltage, a bus voltage input 116 connected to the bus voltage, a generator voltage greater than a bus voltage (GV>BV) input 118 connected to an external switch indicating that the generator voltage must be greater than the bus voltage in order to allow synchronization, and a dead bus enable input 120 which is an override switch for immediately connecting the generator to the bus if a dead bus is detected. The generator voltage input 114 is provided via an isolating transformer to an AC/DC converter 122 which provides a contact sensing power output 124. The generator voltage input 114 is also connected via an isolating transformer to a squaring circuit 126, an AC/DC converter 128, and a voltage acceptance option circuit 130. The squaring circuit 126 provides a signal to microprocessor 102 representative of the frequency and phase (i.e., zero crossing) of the generator voltage. The AC/DC converter 128 provides an analog signal to microprocessor 102 representative of the generator voltage magnitude. The voltage acceptance option circuit 130 provides an analog inhibit (AINH) signal to microprocessor 102 which prevents synchronization if the voltage acceptance option is operational and if the generator voltage is outside the voltage acceptance window.

The bus voltage input 116 is connected via an isolating transformer to a squaring circuit 132, an AC/DC converter 134, the voltage acceptance option circuit 130, and a dead bus option circuit 136. The squaring circuit 132 provides a signal to the microprocessor 102 representing the frequency and phase (i.e., zero crossing) of the bus voltage. The AC/DC converter 134 provides an analog signal to microprocessor 102 which represents the bus voltage magnitude. The voltage acceptance option circuit 130 receives the bus voltage input information for comparison to the generator voltage, and will allow synchronization if the difference is within the voltage acceptance window. The dead bus option circuit 136 receives the bus voltage to allow a dead bus closure in conjunction with an active dead bus enable input 120.

Power is provided to the microprocessor 102 via a power supply module 175. The power up/down reset logic 138 receives 5 and 12 volt inputs and provides reset and power fail signals depending on the monitored conditions. In addition, a watch dog circuit 140 checks that the microprocessor 102 is operational. If some transient condition has disrupted the microprocessor's normal pattern of operation, the watch dog circuit 140 resets the microprocessor 102 and reinitializes the program. The microprocessor 102 is then restarted on its main sequence. If this reset operation occurs three times within a sixty minute period, perhaps indicating some hardware failure, the microprocessor is stopped, effectively shutting down the autosynchronizer 100 and activating a power supply fail alarm via power supply fail circuitry 142 which closes power supply fail relay 144.

Microprocessor 102 accesses information in EEPROM 112 by addressing it via address decode logic 146 via its address bus so that data can be provided to or from the EEPROM 112 via the microprocessor's data bus. The address decode logic 146 also provides output signals to output drivers 148 for selectively actuating a breaker close relay 150 to permit interconnection of the generator and bus. A sync LED 151 is simultaneously actuated with the breaker close relay 150. In addition, logic 146 selectively activates a slip inhibit LED 152 and a generator undervoltage LED 154. In addition, logic 146 activates drivers for actuating a lock out annunciate relay 156 and its associated LED. Access and timing of the microprocessor is controlled by a crystal oscillator 158.

The microprocessor 102 also provides PWM control signals representative of the proportional difference between the bus and generator frequencies to an external bus driver 162 which controls a lower generator frequency relay 164 and a raise generator frequency relay 166 via frequency matching option circuit 168.

In addition, microprocessor 102 provides control signals via external bus drivers 162 for controlling the voltage matching option circuit 170. This optional circuit 170 selectively lowers the generator voltage by relay 172 and selectively raises the generator voltage by relay 174 depending on the comparison between the generator and bus voltage magnitudes.

In one preferred embodiment, autosynchronizer 100 is for use with a system having first and second voltage sources having first and second alternating current (AC) voltages supplied to inputs 114, 116. A breaker circuit 150 connects the first and second voltage sources to each other when the frequency and phase of the first and second AC voltages are synchronized, whereby synchronization is achieved by controlling the first voltage source. AC/DC converter 128 constitutes a first conditioning circuit connected to the first voltage source and providing a first voltage signal representative of the AC voltage of the first source. AC/DC converter 134 constitutes a second conditioning circuit connected to the second voltage source and providing a second voltage signal representative of the AC voltage of the second source. Microprocessor 102 compares frequencies of the first and second voltage signals indicated by squaring circuits 126, 132 and generates a proportional difference signal (PDS) having a parameter representative of a proportional difference in frequency between the first and second voltage signals. The microprocessor receives operator input via the front panel inputs to the input conditioning circuit 106 for programming a value for the parameter. This value for the parameter is relative as it is proportionally reduced in the correction range. Since the value is reduced in the correction range, the programmed value is a maximum value. In particular, the width of the correction pulse is programmable by the operator so that the operator can specify the maximum correction pulse. The microprocessor is programmed to provide a maximum correction pulse width of 99.9 seconds having a maximum period of 199.8 seconds. Microprocessor 102 permits a sync signal when the frequency difference of the frequencies of the first and second voltage signals is within a synchronization frequency range which is programmable by the operator and specified by operator input via the front panel inputs connected to input conditioning 106. The synchronization frequency range is set to a default range of four times maximum slip. Frequency matching circuit 168 constitutes a first output circuit responsive to the proportional difference signal and providing a correction signal via relays 164 and 166 to the first voltage source for varying the frequency of the first voltage. Relay 150 constitutes a second output circuit responsive to the sync signal and providing a breaker close signal to the breaker circuit for closing the breaker thereby connecting the first and second voltage sources whereby proportional control of the frequency of the first voltage source is achieved when the frequency of the first voltage source is not synchronized with the frequency of the second voltage source.

FIG. 2 illustrates operation of the microprocessor 102 to provide proportional generator frequency control with the GF>BF switch in an open position. The frequency difference between the generator frequency and the bus frequency is indicated along the x axis. To the left of the zero slip point, the graph illustrates negative slip frequencies, i.e., the generator frequency is less than the bus frequency. To the right of the zero slip point, the graph of FIG. 2 illustrates positive slip frequencies, i.e., the generator frequency is greater than the bus frequency. Initially, a maximum slip frequency difference, such as −0.1 Hz to +0.1 Hz, defines the synchronization range. When the GF/BF difference is within the synchronization range, microprocessor 102 permits a sync signal by closing relay 150, provided an advance angle can be calculated from the slip frequency, the changing phase angle and the breaker anticipation time (i.e., the time required for the breaker contacts to close after the breaker receives a sync signal) preset into the autosynchronizers's memory. The breaker anticipation time is programmable.

Encompassing and extending within the synchronization range is a proportional correction range defined by four (4) times the maximum slip difference on either side of zero slip. Below a negative slip frequency of 4 times the maximum slip difference, and above a positive slip frequency of 4 times the maximum slip difference, a maximum or 100% correction pulse for control of the generator frequency is provided. On the other hand, within the 4 times maximum slip difference, a proportional correction range is defined in which the generator frequency is adjusted in proportion to the amount of frequency difference. On the negative slip frequency side, line 202 illustrates that the percentage correction linearly decreases from 4 times maximum slip difference to one half maximum slip difference. Similarly, on the positive slip frequency side, line 204 illustrates that the percentage correction increases from a half maximum slip difference to 4 times maximum slip difference. This proportional correction is implemented by microprocessor 102 through controlling the duty cycle of relays 164 and 166.

Referring now to the expanded portion 206 of FIG. 2, it can be seen that any frequency difference less than half maximum slip is defined as a frequency correction dead band in which limited proportional correction occurs. However, there is a target slip band defined by a minimum slip difference on either side of the zero slip point. In the preferred embodiment illustrated in FIG. 2, the minimum slip is equal to 1/16th of the maximum slip. Within this target slip band, target pulses are generated by microprocessor 102 to momentarily close either relay 164 or relay 166. The target pulses generated by microprocessor 102 are a reduced proportional difference signal provided when the difference between the frequencies of the generator and bus voltages is within the target slip band within the frequency correction dead band. The target pulses prevent a sustained steady state out of phase relationship between the generator and bus voltages, frequently referred to as a hung scope. The target pulses are intended to nudge the generator frequency governor in a direction as to provide the fastest phase match. Target pulses will be enabled when the slip frequency is less than the minimum slip frequency, referred to as the target slip band. Target pulses are also proportionally related to slip frequency, however, they have a minimum pulse width of 200 milliseconds. It should be noted that the direction criteria is based on the quickest direction to achieve zero phase angle and not frequency at this point. As indicated by dotted lines 208 and 210, the target pulses have the same lineal proportion as the correction pulses in the proportional correction range with a 200 millisecond minimum indicated at 209. Also, both the correction pulses and the target pulses have a constant period so that the mark/space ratio varies depending on the percentage correction of the pulse width.

FIG. 3 illustrates the operation of microprocessor 102 providing proportional generator frequency control with the GF>BF switch closed. For negative slip frequency differences less than the maximum slip difference and for positive slip frequency differences greater than the maximum slip difference, the control according to FIG. 3 is the same as the control according to FIG. 2. However, as illustrated by the expanded portion 212, when the frequency difference is less than the half maximum slip difference, the FIG. 3 operation of microprocessor 102 as particularly illustrated by expanded portion 212 is different from the FIG. 2 operation as illustrated by expanded portion 206. In particular, FIG. 3 shows that the correction dead band is defined as positive slip frequency differences less than maximum slip and greater than zero slip. In addition, the target slip band is defined between zero slip and the minimum slip. When the negative slip frequency difference is less than zero slip and greater than 4 times the maximum slip, linear proportional control along lines 202 and 208 are accomplished with a 200 millisecond minimum.

In other words, with the GF>BF switch open, as illustrated in FIG. 2, the microprocessor 102 provides proportional correction which is symmetrical about the zero slip frequency difference. In contrast, as illustrated in FIG. 3, with the GF>BF switch closed, there is a difference in the correction procedure implemented by the microprocessor 102 for negative slip frequency differences between minimum slip and half maximum slip as compared to positive slip frequency differences between minimum slip and half maximum slip. In FIG. 3, the frequency correction dead band equals positive frequency differences less than half a maximum slip difference and greater than zero slip. In addition, microprocessor 102 generates a reduced proportional difference signal when the difference between the frequencies of the generator and bus voltages is within the target slip band within the frequency correction dead band whereby the reduced proportional difference signal prevents a sustained steady state out of phase relationship between the bus and generator voltages.

As shown in FIG. 3, the microprocessor 102 defines the synchronization frequency range as equal to positive frequency differences less than the maximum slip difference and greater than zero slip. Therefore, another difference between FIG. 3 and FIG. 2 is that in FIG. 3 synchronization is enabled only when the generator frequency is greater than the bus frequency and the slip frequency is a positive slip frequency less than maximum slip frequency setting. When the slip frequency is outside of the synchronization range, it is indicated by an illuminated slip inhibit LED 152. Therefore, synchronization cannot occur below zero slip which avoids excessive stress on generator.

Figure 4:
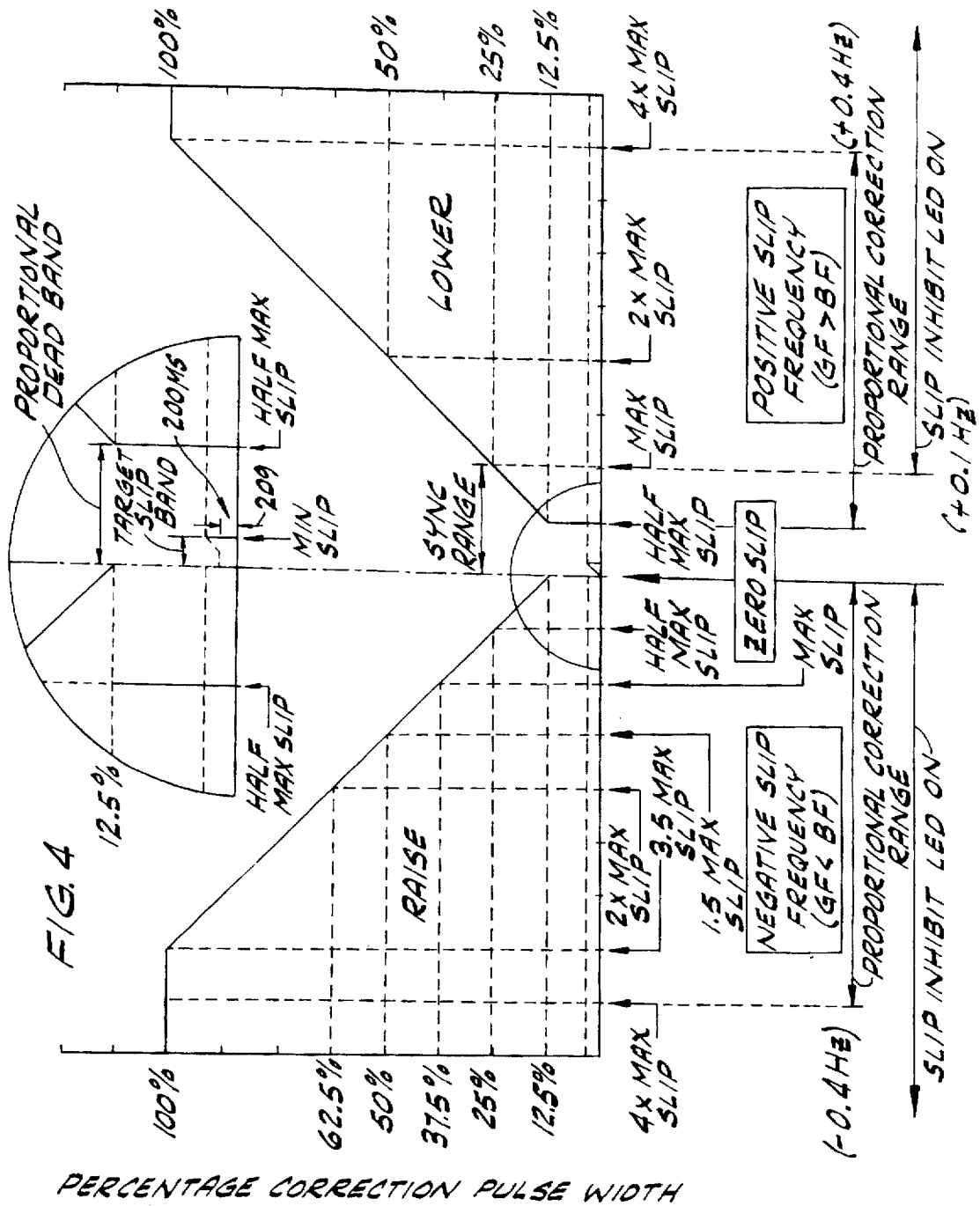
FIG. 4 is a graph illustrating proportional frequency control above a frequency correction dead band and below a zero slip frequency difference with frequency difference along the x-axis and speed correction duty cycle along the y-axis. The frequency control outside the sync range is asymmetrical about the zero slip line because the percentage correction pulse width to raise pulses in the negative slip frequency range is Shifted to the right as compared to FIGS. 2 and 3.

FIG. 4 is a graph illustrating proportional frequency control above a frequency correction dead band and below a zero slip frequency difference with frequency difference along the x-axis and speed correction duty cycle along the y-axis. The frequency control outside the sync range is asymmetrical about the zero slip line because the percentage correction pulse width to raise pulses in the negative slip frequency range is shifted to the right as compared to FIGS. 2 and 3. If line R were extended to cross the X axis, as indicated by dashed line R', line R would intersect at the half maximum slip point to the right of the zero slip point.

FIG. 4 illustrates an alternative to FIG. 3 in which the operation of microprocessor 102 provides asymmetrical proportional generator frequency control with the GF>BF switch closed. For positive slip frequency differences greater than the maximum slip difference, the control according to FIG. 4 is the same as the control according to FIGS. 2 and 3. However, when the frequency difference is less than the zero slip difference, the FIG. 4 operation of microprocessor 102 is different from the operation of FIGS. 2 and 3. In particular, FIG. 3 shows that the correction dead band is defined as positive slip frequency differences less than maximum slip and greater than zero slip. In addition, the target slip band is defined between zero slip and the minimum slip. When the negative slip frequency difference is less than zero slip and greater than 3.5 times the maximum slip, linear proportional control along line 302 is accomplished with a 200 millisecond minimum. Also, the proportional correction for a negative slip frequency difference of value A is greater than the proportional correction for a positive slip frequency difference of value A. For example, as shown in FIG. 4, a proportional correction pulse width of 37.5% is used when the negative slip frequency difference is equal to the maximum slip difference. This 37.5% correction is greater than the proportional correction pulse width of 25% which is used when the positive slip frequency difference is equal to the maximum slip difference In other words, with the GF>BF switch open, as illustrated in FIGS. 2 and 3, the microprocessor 102 provides proportional correction outside the half maximum slip difference which is symmetrical about the zero slip frequency difference. In contrast, as illustrated in FIG. 4, with the GF>BF switch closed, there is a difference in the correction procedure implemented by the microprocessor 102 for negative slip frequency differences as compared to positive slip frequency differences. In FIG. 4, the frequency correction dead band equals positive frequency differences less than half a maximum slip difference and greater than zero slip. In addition, microprocessor 102 generates a reduced proportional difference signal when the difference between the frequencies of the generator and bus voltages is within the target slip band within the frequency correction dead band whereby the reduced proportional difference signal prevents a sustained steady state out of phase relationship between the bus and generator voltages.

As shown in FIG. 4, the microprocessor 102 defines the synchronization frequency range as equal to positive frequency differences less than the maximum slip difference and greater than zero slip. Therefore, another difference between FIG. 4 and FIG. 2 is that in FIG. 4 synchronization is enabled only when the generator frequency is greater than the bus frequency and the slip frequency is a positive slip frequency less than maximum slip frequency setting. When the slip frequency is outside of the synchronization range, it is indicated by an illuminated slip inhibit LED 152. Therefore, synchronization cannot occur below zero slip which avoids excessive stress on the generator.

In FIGS. 2 and 3, the proportional control is implemented in a proportional correction range from –4(MAX SLIP) to +4(MAX SLIP). In FIG. 4, the proportional control is implemented in a proportional correction range from –3.5 (MAX SLIP) to +4(MAX SLIP). In the proportional correction range, proportional control is accomplished by varying the pulse width of the correction signals provided to the speed governor. In particular, the duty cycle of the lower generator frequency relay 164 and the duty cycle of the raise generator frequency relay 166 are varied within the proportional correction range. For slip frequencies within the proportional correction range, the magnitude of the frequency correction pulse widths will begin to compress and the magnitude of the correction pulse delays will begin to expand as a proportional function of the slip frequency. The directional criteria, whether to issue raise or lower pulses which would close relay 166 or relay 164, respectively, is based upon the polarity of the slip frequency. Negative slip frequencies issue raise correction pulses to close relay 166 and positive slip frequencies issue lower correction pulses to close relay 164. In addition, the correction pulse width/delay will dynamically respond to changing slip frequencies. This allows for more effective control of unstable hydrogovernors.

The frequency correction dead band is so named because limited corrections are issued therein which is generally defined as below half maximum slip. Synchronization is enabled by closing relay 150 when the slip frequency is less than the maximum slip setting, and all other conditions are satisfied.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. An apparatus for use with a system having first and second voltage sources having first and second alternating current (AC) voltages, respectively, said system having a breaker circuit for connecting the first and second voltage sources to each other, said apparatus for synchronizing frequency and phase of the first and second AC voltages by controlling the first voltage source, said apparatus comprising:

a first conditioning circuit connected to the first voltage source and providing a first voltage signal representative of the first AC voltage of the first source;

a second conditioning circuit connected to the second voltage source and providing a second voltage signal representative of the second AC voltage of the second source;

a microprocessor comparing frequencies of the first and second voltage signals, said microprocessor generating a proportional difference signal having a parameter representative of a proportional difference in frequency between the first and second voltage signals, said microprocessor having an operator input for programming a maximum value for the parameter, said microprocessor permitting a sync signal when the frequency difference of the frequencies of the first and second voltage signals is within a synchronization frequency range;

a first output circuit responsive to the proportional difference signal and providing a correction signal corresponding to the parameter and provided to the first voltage source for varying the frequency of the first AC voltage whereby the operator can specify a maximum value of the correction signal; and a second output circuit responsive to the sync signal and providing a breaker close signal to the breaker circuit for closing the breaker thereby connecting the first and second voltage sources whereby proportional control of the frequency of the first voltage source is achieved when the frequency of the first voltage source is not synchronized with the frequency of the second voltage source.

2. The apparatus of claim 1 wherein the synchronization frequency range equals positive and negative frequency differences less than a maximum slip difference, and wherein the microprocessor provides the proportional difference signal when the difference between the frequencies of the first and second voltage signals is within a proportional correction range which extends within the synchronization frequency range.

3. The apparatus of claim 2 wherein the proportional correction range equals positive and negative frequency differences less than four times the maximum slip difference and wherein the proportional difference has a maximum value when the difference between the frequencies of the first and second voltage signals is outside the proportional correction range whereby a maximum correction signal is provided when the difference is outside the proportional correction range.

4. The apparatus of claim 1 wherein the microprocessor does not generate a proportional difference signal when the difference between the frequencies of the first and second voltage signals is within a frequency correction dead band whereby no proportional control of the first voltage source is achieved when the frequency difference is within the frequency correction dead band.

5. The apparatus of claim 4 wherein the frequency correction dead band equals positive and negative frequency differences less than half a maximum slip difference.

6. The apparatus of claim 4 wherein the frequency correction dead band equals positive frequency differences less than half a maximum slip difference and greater than zero slip.

7. The apparatus of claim 4 wherein the microprocessor generates a reduced proportional difference signal when the difference between the frequencies of the first and second voltage signals is within a target slip band within the frequency correction dead band whereby the reduced proportional difference signal prevents a sustained steady state out of phase relationship between the first and second voltages.

8. The apparatus of claim 7 wherein the target slip band equals positive and negative frequency differences less than a minimum slip difference.

9. The apparatus of claim 7 wherein the target slip band equals positive frequency differences less than a minimum slip difference and greater than zero slip.

10. The apparatus of claim 4 wherein the frequency correction dead band is narrower than and within the synchronization frequency range.

11. The apparatus of claim 1 wherein the microprocessor provides linear proportional difference signals within at least a portion of the synchronization frequency range so that proportional control of the frequency of the first voltage source is achieved when the frequency difference is within the portion of the synchronization frequency range.

12. The apparatus of claim 1 wherein the microprocessor permits the sync signal only when the frequency difference of the first and second voltage signals is within the synchronization frequency range and a phase difference between the first and second voltage signals is within a synchronization phase range.

13. The apparatus of claim 1 wherein the synchronization frequency range equals positive frequency differences less than the maximum slip difference and greater than zero slip.

14. The apparatus of claim 13 wherein the proportional correction is asymmetrical about a zero slip point.

15. The apparatus of claim 14 wherein the proportional correction for a negative slip frequency difference of value A is greater than the proportional correction for a positive slip frequency difference of value A.

16. The apparatus of claim 1 wherein the proportional correction is symmetrical about a zero slip point.

17. The apparatus of claim 1 wherein the microprocessor provides proportional difference signals within a portion of the synchronization frequency range having negative frequency differences so that proportional control of the first voltage source is achieved within the synchronization frequency range when the frequency difference is below zero slip.

18. The apparatus of claim 1 wherein the parameter comprises a duty cycle of a pulsed signal and wherein the pulsed signal has a constant period and a varying mark/space ratio.

19. The apparatus of claim 1 wherein the parameter representative of a proportional difference in frequency between the first and second voltage signals is a pulsed proportional difference signal having a pulse width representative of a proportional difference in frequency between the first and second voltage signals and having a pulse interval.

20. An apparatus for use with a system having first and second voltage sources having first and second alternating current (AC) voltages, respectively, said system having a breaker circuit for connecting the first and second voltage sources to each other, said apparatus for synchronizing frequency and phase of the first and second AC voltages by controlling the first voltage source, said apparatus comprising:

- a first conditioning circuit connected to the first voltage source and providing a first voltage signal representative of the first AC voltage of the first source;
- a second conditioning circuit connected to the second voltage source and providing a second voltage signal representative of the second AC voltage of the second source;
- a microprocessor comparing frequencies of the first and second voltage signals, said microprocessor generating a proportional difference signal having a parameter representative of a proportional difference in frequency between the first and second voltage signals, said microprocessor having an operator input for programming a synchronization frequency range, said microprocessor permitting a sync signal when the frequency difference of the frequencies of the first and second voltage signals is within the programmable synchronization frequency range;
- a first output circuit responsive to the proportional difference signal and providing a correction signal to the first voltage source for varying the frequency of the first AC voltage; and
- a second output circuit responsive to the sync signal and providing a breaker close signal to the breaker circuit for closing the breaker thereby connecting the first and second voltage sources whereby portional control of the frequency of the first voltage source is achieved when the frequency of the first voltage source is not synchronized with the frequency of the second voltage source.

21. An apparatus for use with a system having first and second voltage sources having first and second alternating current (AC) voltages, respectively, said system having a breaker circuit for connecting the first and second voltage sources to each other, said apparatus for synchronizing frequency and phase of the first and second AC voltages by controlling the first voltage source, said apparatus comprising:

- a first conditioning circuit connected to the first voltage source and providing a first voltage signal representative of the first AC voltage of the first source;
- a second conditioning circuit connected to the second voltage source and providing a second voltage signal representative of the second AC voltage of the second source;
- a microprocessor comparing frequencies of the first and second voltage signals, said microprocessor generating a proportional difference signal having a parameter representative of a proportional difference in frequency between the first and second voltage signals, said microprocessor generating the proportional difference signal when the difference between the first and second voltages is within a programmable proportional correction range, said microprocessor having an operator input for programming the proportional correction range, said microprocessor permitting a sync signal when the frequency difference of the frequencies of the first and second voltage signals is within a synchronization frequency range within the programmable proportional correction range;
- a first output circuit responsive to the proportional difference signal and providing a correction signal to the first voltage source for varying the frequency of the first AC voltage; and
- a second output circuit responsive to the sync signal and providing a breaker close signal to the breaker circuit for closing the breaker thereby connecting the first and second voltage sources whereby proportional control of the frequency of the first voltage source is achieved when the frequency of the first voltage source is not synchronized with the frequency of the second voltage source.

* * * * *